United States Patent [19]

Howarth et al.

[11] Patent Number: 4,907,964
[45] Date of Patent: Mar. 13, 1990

[54] DEVICE FOR EXTRACTING AND BURNING METHANE

[75] Inventors: Stephen Howarth, Nottingham; William L. Hall, Duffield, both of United Kingdom

[73] Assignee: Coal Industry (Patents) Limited, London, England

[21] Appl. No.: 664,746

[22] Filed: Oct. 25, 1984

Related U.S. Application Data

[63] Continuation of Ser. No. 414,081, Sep. 1, 1981, abandoned.

[30] Foreign Application Priority Data

Sep. 29, 1981 [GB] United Kingdom ................. 8129334

[51] Int. Cl.4 .................... F23D 14/00; F23D 14/08
[52] U.S. Cl. .................... 431/202; 431/346; 431/343; 431/354; 431/355
[58] Field of Search ............... 431/343, 202, 504, 354, 431/355, 346.13

[56] References Cited

U.S. PATENT DOCUMENTS

| | | | |
|---|---|---|---|
| 424,738 | 4/1898 | Taylor | 431/355 |
| 1,466,356 | 8/1923 | Eddison | 431/354 X |
| 1,961,572 | 6/1934 | Roth | 431/355 |
| 2,618,540 | 11/1952 | Teti | 431/346 X |
| 3,825,404 | 7/1974 | DeGooville | 431/354 |
| 3,905,756 | 9/1975 | Ferlin et al. | 431/354 |
| 3,925,001 | 12/1975 | Salooja | 431/4 |
| 3,941,556 | 3/1976 | Pallagi | 431/202 |

FOREIGN PATENT DOCUMENTS

| | | | |
|---|---|---|---|
| 122708 | 11/1946 | Australia | 431/355 |
| 595246 | 3/1934 | Fed. Rep. of Germany | 431/355 |
| 2034284 | 7/1972 | Fed. Rep. of Germany | 431/355 |
| 1261373 | 4/1961 | France | 431/355 |
| 181655 | 6/1922 | United Kingdom | 431/355 |

Primary Examiner—Carl D. Price
Attorney, Agent, or Firm—James C. Wray

[57] ABSTRACT

Apparatus for extracting and burning methane gas from a landfill refuse site comprises a first venturi to which is fed compressed air. The venturi is connected to a well in the site and acts to draw methane from the well. The methane/air mixture is fed to a second venturi for enrichment with air. The enriched mixture is fed to a burner for combustion.

Preferably the compressed air is supplied by a diesel driven compressor.

7 Claims, 3 Drawing Sheets

DEVICE FOR EXTRACTING AND BURNING METHANE

This application is a continuation of application Ser. No. 414,081, filed 9/1/82, now abandoned.

The present invention relates to apparatus for extracting and burning methane or other inflammable gases, and relates in particular, but not exclusively, to apparatus for use on a landfill refuse site.

It is known that landfill refuse sites maintained under substantially anaerobic conditions will produce methane by decomposition of the refuse. In large landfills it is possible to extract methane for collection in economically viable quantities. However, in smaller landfills or in landfills with low amounts of decomposable refuse, it is not possible to extract economical quantities of methane. It is nonetheless desirable to remove the methane from the site in order to render the site re-usable. If the methane is not extracted there is a possibility of its building up into explosive mixtures which would be hazardous to the users of the site. It is therefore the practice to extract the methane from these sites and burn it off. It is also common practice on larger sites to burn gas extracted during testing to determine the viability of collecting the gas in the landfill.

At present this is achieved by forming a well in the landfill and connecting it to a pump which supplies gas from the well to a burner. On many sites there is no main electricity supply and it is necessary either to have a connection to the main supply made or to provide a generator on site. This adds to the cost and maintenance load of the operation.

It is known to mix air and gas in a mixing device which includes a venturi whereby air flowing through the orifice of the venturi mixes with a gas surrounding the venturi. The proportions of air and gas are difficult to control with substantial ancillary apparatus such as blowers and control gear.

It is therefore an aim of the present invention to provide a device for extracting and burning methane from a landfill site which at least in part overcomes the disadvantages of presently used devices.

Therefore, according to one aspect of the present invention apparatus for extracting and burning an inflammable gas comprises:

a first venturi having two pressure inlets and an outlet, a first of said inlets being a high pressure inlet arranged for connection to a source of compressed air, and the second of said inlets being a low pressure inlet arranged for connection to a source of inflammable gas, a second venturi also having two pressure inlets and an outlet, the first of said inlets being a high pressure inlet connected to the outlet of the first venturi, and the second of said inlets being a low pressure inlet for receiving air at ambient pressure; and a burner connected to the outlet of the second venturi for burning the inflammable gas.

The source of compressed air may be a compressor, which advantageously, is powered by an internal combustion engine to provide a source for the first venturi. Conveniently, the compressor is run by a diesel engine.

The source of inflammable gas is preferably a well in a landfill refuse site in which methane is formed by anaerobic decomposition. In many cases the gas will generate a positive pressure in the well to augment the effect of the device.

The design of the venturis and the pressure at which the compressed air is supplied will need to be chosen having regard to the requirements of the burner and the proportions in which a mixture of air and the gas is inflammable. It will therefore also be necessary at least approximately to known the composition of the inflammable gas and the pressure at which it is found. For instance, in a landfill refuse site, the methane is generated at very low pressure and contains nitrogen and carbon oxides. It will therefore be necessary to supply the compressed air at relatively high pressure in order to extract the gas from the well.

The rate of flow of mixture to the burner will in general be controlled by the pressure at which the compressed air is supplied to the first venturi, and the composition of the mixture will be determined by the size of the low pressure inlet to the second venturi, this size may be variable. Compressed air is supplied to the first venturi at high pressure and forms about 50% V/V of the mixture fed to the second venturi.

Conveniently, the apparatus includes at least one rotameter or other gas flow measuring means for monitoring the operation of the apparatus. Preferably a rotameter is supplied in each of the compressed air and inflammable gas supply lines. If the flow of inflammable gas is insufficient to maintain combustion in the burner, its supply line may be closed to allow enough gas to build up before burning is continued. A rotameter may also be fitted between the first and second venturis.

Preferably, a flame arrestor is placed in the gas line to prevent burn back in the gas line due to a failure of the compressor air supply.

It is envisaged that the apparatus of the present invention will be of particular, but not exclusive use, in removing methane from a landfill refuse site, either during site testing or to prepare the site for reuse. However, the apparatus will also fine use in other technologies for flaring off inflammable gases formed at low pressure.

According to another aspect of the present invention a landfill site reclamation installation includes apparatus for extracting and burning inflammable gases present in the site and including a burner, a first and second venturi means each having a first and second input and an output, extraction pipe means and a supply source for compressed air; the extraction pipe means extending at one end into a well on the site and being connected at its other end to the second input of the first venturi means, the supply source for compressed air being connected to the first input of the first venturi means; the outlet of the first venturi means being connected to the first input of the second venturi means and the second input of the second venturi means being adapted to receive ambient air and the burner is connected to the outlet of the second venturi, whereby when compressed air is supplied to the first venturi gas is withdrawn from the well and mixed with air in the second venturi before being fed to the burner for ignition.

The invention will now be described by way of example only with reference to the accompanying drawings, in which.

Figure 1:
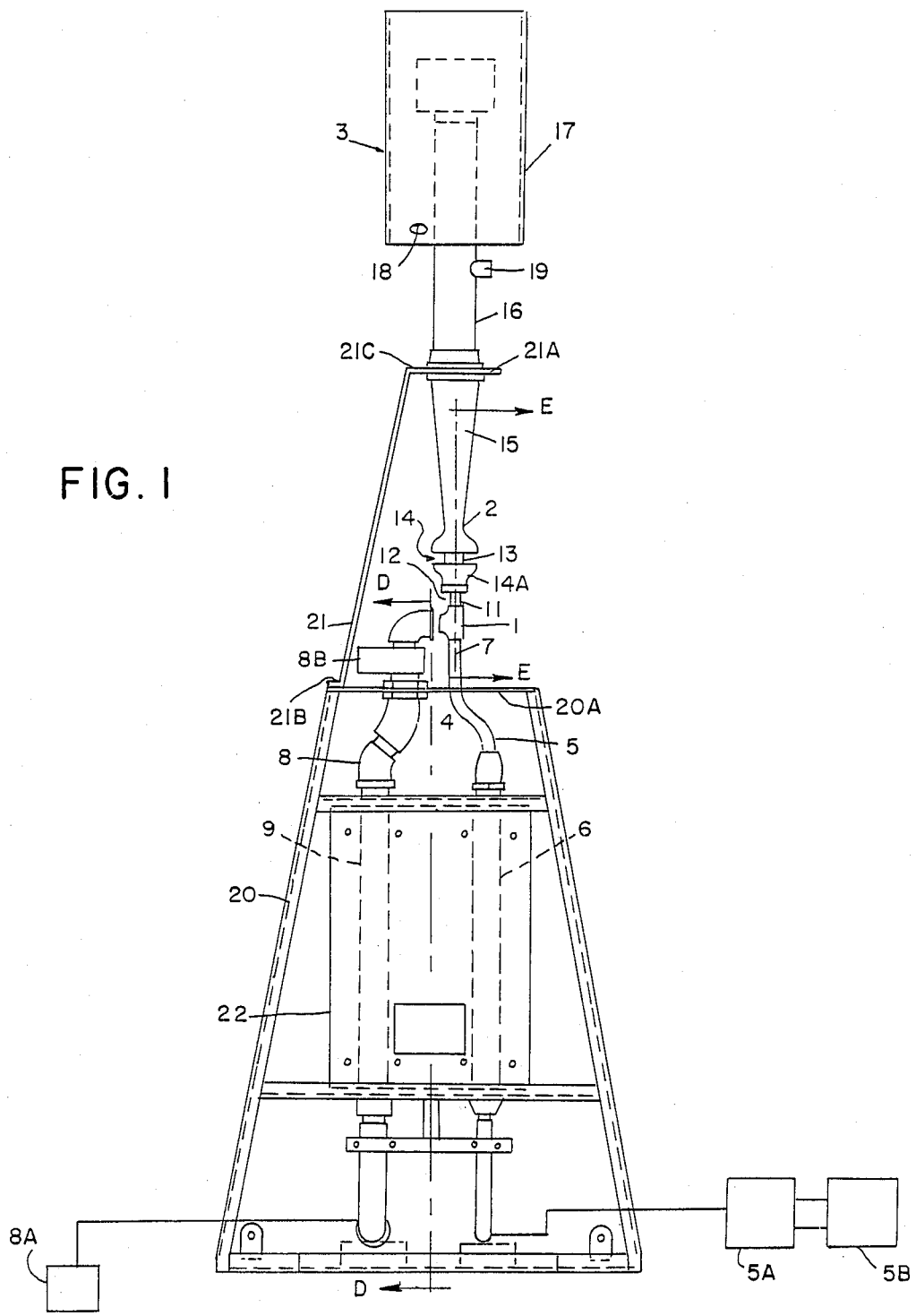
FIG. 1 shows a side view of apparatus according to the invention.
Figure 2:
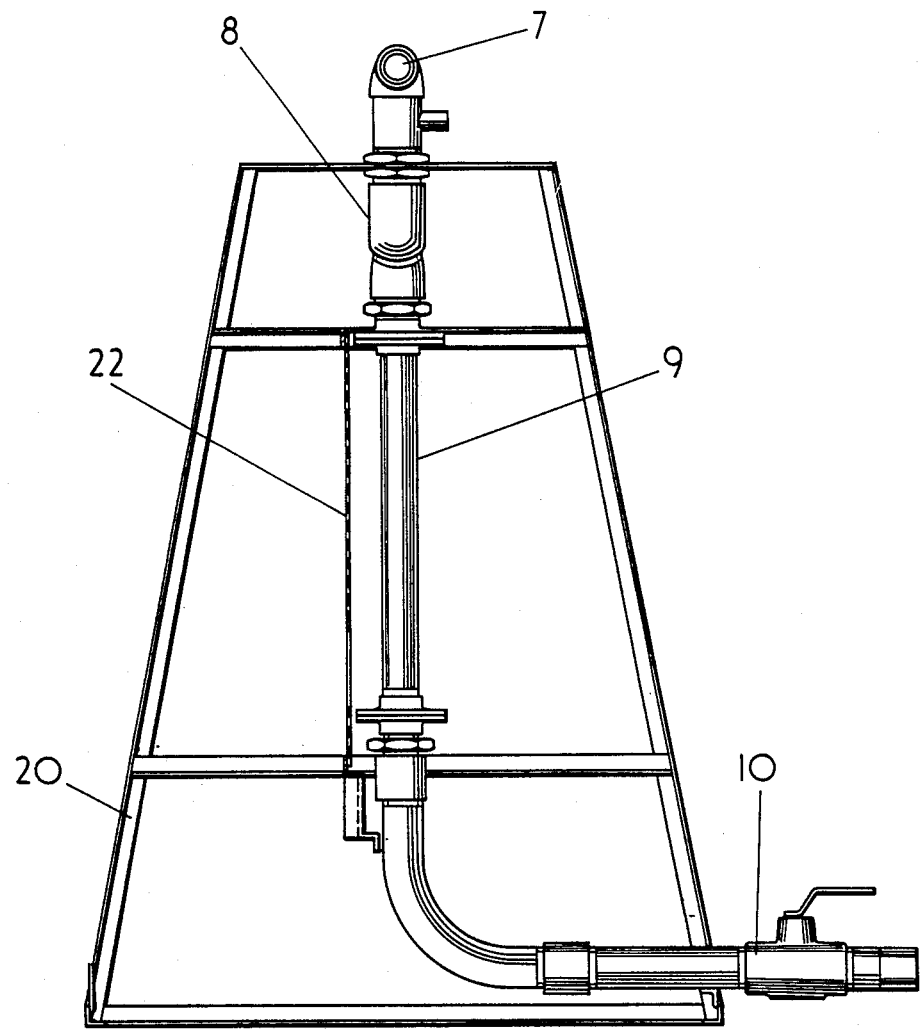
FIG. 2 shows a sectional view along line D—D of FIG. 1.

Referring now to the Figures, the apparatus according to the invention comprises a first venturi 1, a second venturi 2 and a burner 3. Details of the venturis 1 and 2 are shown more clearly in FIG. 3. The high pressure inlet 4 of the first venturi 1 is connected by pipe 5 to a source of compressed air via a rotameter 6. A air compressor 5A driven by a diesel engine 5B supplies air at a high pressure to the first venturi. The low pressure inlet 7 of the first venturi 1 is connected by an extraction pipe 8 to a well 8A in a landfill refuse site (not shown) via a rotameter 9. The pipe 8 is closable by use of manually operated valve 10.

A short pipe 11 connects the outlet 12 of the first venturi 1 to the high pressure inlet 13 of the second venturi 2. The low pressure inlet 14 of the second venturi 2 comprises an annular orifice through which air may be drawn from the atmosphere. The outlet 15 of the second venturi 2 is connected directly to the inlet 16 of the burner 3. The inlet 16 supports a cylindrical wind shield 17 by means of a spider 18. A closable tube 19 is attached to the inlet 16 for connection to a pressure gauge (not shown).

The device is supported on a truncated triangular frame 20 which positions plates 21 and 22 to protect the rotameters 6 and 9 and the annular orifice 14.

The burner 3 comprises a conventional gas burner of any suitable type. In this particular case a RETAIN-A-FLAME Straight Burner Nozzle No. 1130A, supplied by Stordy Combustion Eng. Ltd. of Heath Mill Road, Wombourne, West Midlands, WV5 8BD is used.

In use, the valve 10 is opened and the compressed air supply operated to provide a stream of compressed air at a pressure of about 25 p.s.i. ($1.724 \times 10^5$ N/M$^2$). The gas in the landfill site is at a pressure of less than 1 inch (2.5 cm) water gauge and has a composition of approximately 60% V/V methane and 40% V/V $CO_2$.

As the compressed air at a pressure of about 25 p.s.i. ($1.724 \times 10^5$ N/M$^2$) and at a rate of 30 c.f.m. emerges through the inlet 4 it creates a pressure drop at inlet 7 thereby drawing gas along pipe 8 and into the venturi 1 wherein it is mixed with the compressed air.

The compressed air, in effect, is used to entrain the gas with the compressed air as it flows out of the first venturi. Therefore, entraining acts to extract the gas from the well. The pressure and flow rate of the compressed air will need to be varied to suit the gas being extracted and the size of the installation. The relative flows of air and inflammable gas are monitored on the rotameters 6 and 9. The mixture of gas and air passes out of the outlet 12 through the pipe 11 to the inlet 13 of the second venturi 2. Since the mixture is at higher pressure than ambient, it causes a pressure drop across the orifice 14 thereby drawing air into the venturi 2 for mixing with the gas/air mixture. Size of the orifice 14 is varied by turning the threaded collar 14A to open or close the orifice. The air enriched mixture is fed through the outlet 15 and inlet 16 to the burner 3 wherein it is combusted.

If the rotameter 9 indicates a low flow of inflammable gas the apparatus may be turned off to allow gas to accumulate in the well. However, there is no need to interrupt the compressed air supply as this will have no deleterious effects if run by itself.

The compressed air supply comprises a diesel engine driven gas compressor. A 8B is fitted into the gas supply pipe 8 to prevent flame back if the compressor should fail.

plate 21 is fixedly attached to an upper support plate 20A of the triangular frame 20, and extends vertically upwardly at an angle in line with one side of the frame.

The plate 21 can be secured to the support plate 20A or the frame 20 by any conventional means such as wielding. Preferably, the plate 21 has flanges 21B and 21C at opposite ends thereof. The flanges provide horizontal mounting surfaces for mounting the plate 21 to the triangular frame 20 and for mounting the burner and second venturi to the plate 21, as described below.

Upper flange 21C is fixedly attached to an annular support collar 21A which circumscribes the inlet 16 of the burner and the outlet 15 of the second venturi.

Figure 3:
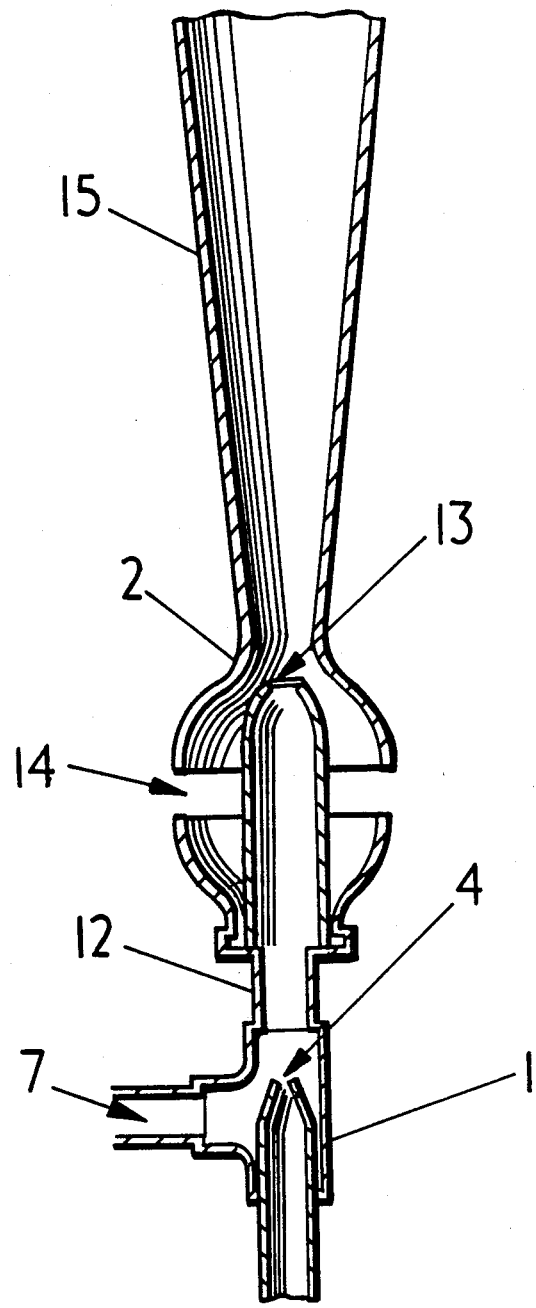
FIG. 3 shows a sectional view along line E—E of FIG. 1.

As shown in FIG. 3, the outlet 15 of the second venturi is not physically attached to the high pressure inlet 13 or the threaded collar 14A, and therefore, relies for support on the plate 21. The plate 21, while supporting the outlet 15 over the high pressure inlet 13, also supports the burner 3 vertically above the outlet 15.

From the above it can be seen that, while the first and second venturis and the burner are vertically aligned, the alignment is maintained not by the inter-connection of the component parts, but by the support provided by plate 21.

It will be seen that the apparatus according to the present invention does not have any moving parts apart from the gas compressor There is no need for any electrical power supply on the site. Gas compressors are known to be robust and need little maintenance. It is therefore possible to leave the apparatus working unattended for long periods.

We claim:

1. An apparatus for extracting and burning inflammable gas from landfill refuse sites, comprising,
   a support frame having a truncated triangular shape,
   a first venturi having a high pressure inlet connected to a source of compressed air,
   a low pressure inlet connected to a source of inflammable gas, and an outlet for delivering a mixture of inflammable gas and compressed air, the first venturi being supported vertically above the support frame by a horizontal support plate disposed at the top of the support frame,
   an upper support plate extending upwardly from the top of the support frame and being connected to the support frame at its distal end,
   a second venturi having a high pressure inlet connected to the outlet of the first venturi, a low pressure inlet being defined by a gap between an axially movable collar and a proximal end of an outlet for the second venturi, a distal end of the second venturi high pressure inlet extending into the proximal end of the second venturi outlet, the second venturi outlet being supported vertically above the second venturi high pressure inlet by connection to a distal end of the upper support plate,
   a burner having an inlet connected to a distal end of the second venturi outlet and being supported vertically above the second venturi outlet by connection to the distal end of the support plate.

2. The apparatus of claim 1 further comprising
   a first rotometer disposed in line between the source of compressed air and the high pressure inlet of the first venturi.

3. The apparatus of claim 1 further comprising,
   a second rotometer disposed in line between the source of inflammable gas and the low pressure inlet of the first venturi.

4. The apparatus of claim 1, wherein the upper support plate extends vertically upwardly at an angle in line with one side of the support frame, and wherein the opposite ends are provided with flanges for mounting the proximal end to the top of the support frame and the distal end to the burner.

5. The apparatus of claim 4 further comprising,
a collar fixedly attached to the flange at the distal end of the support plate and being connected to an outer cylindrical surface to the burner inlet and second venturi outlet.

6. The apparatus of claim 1 further comprising,
a flame arrestor disposed in line between the source of inflammable gas and the low pressure inlet of the first venturi.

7. The apparatus of claim 1 wherein the axially movable collar threadedly engages the outlet of the first venturi to provide means for adjusting flow through the second venturi low pressure inlet.

* * * * *